June 23, 1931.　　　G. D. HOFFMAN　　　1,811,392
SWIVEL TUBE CONNECTION
Filed June 9, 1925
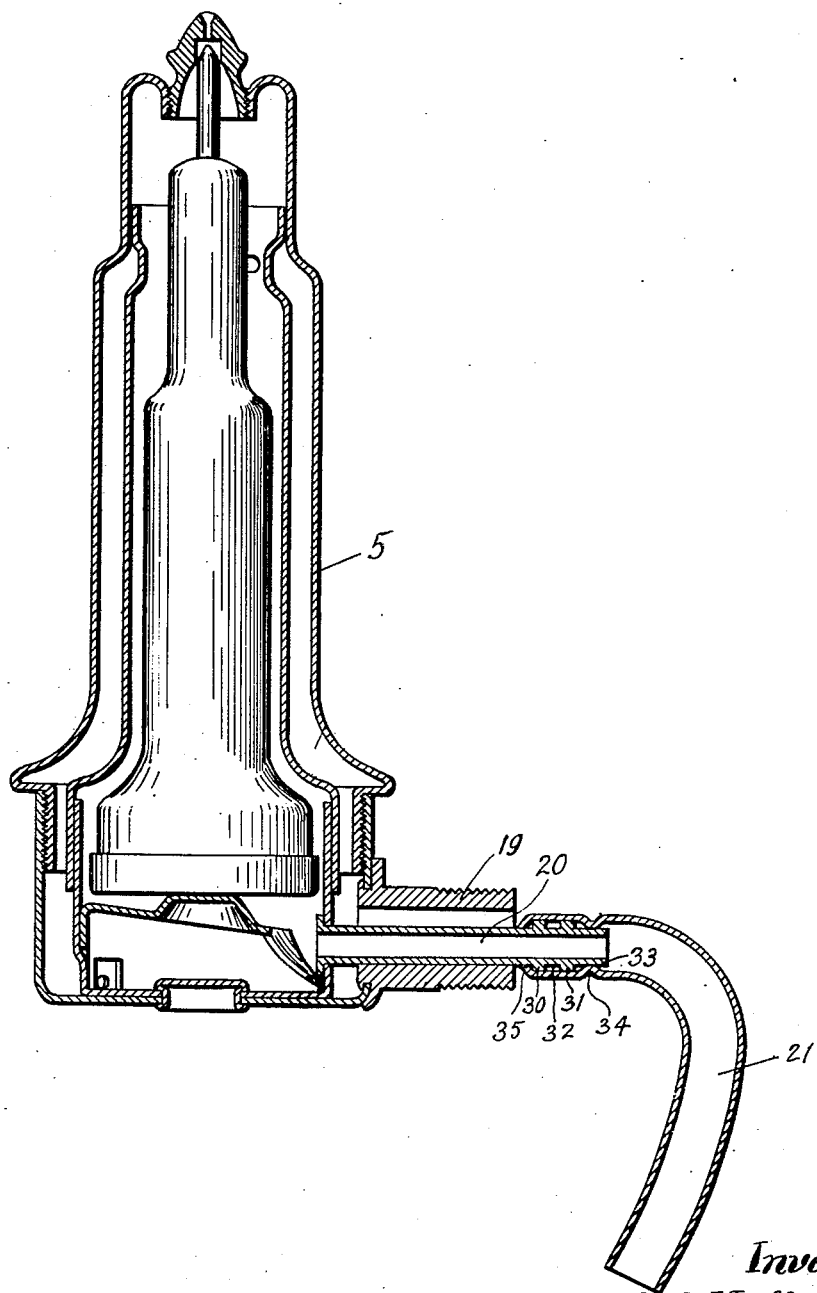
Inventor
G. D. Hoffman
by Wright, Brown, Quinby & May
Attys.

Patented June 23, 1931

1,811,392

UNITED STATES PATENT OFFICE

GEORGE D. HOFFMAN, OF PASADENA, CALIFORNIA, ASSIGNOR TO HOFFMAN SPECIALTY COMPANY, OF WATERBURY, CONNECTICUT, A CORPORATION OF ILLINOIS

SWIVEL TUBE CONNECTION

Original application filed January 24, 1922, Serial No. 531,425. Divided and this application filed June 9, 1925. Serial No. 36,055.

This invention relates to means or structures by which to connect together tubes in a manner permitting relative swiveling movement between them and at the same time enabling them to be made substantially leakage tight, at least to the extent required for the particular uses to which the tubes so coupled are put.

The main object of the invention is indicated in the foregoing statement. A more particular object and field of usefulness of the invention is in connection with valves for radiators of steam heating systems provided to relieve the radiators of accumulated air and in such cases the swivel connection is provided between a fixed tube in the valve and a siphon tube which depends from such fixed tube, within the radiator, and is provided to drain water from the valve back into the radiator. With this use more particularly in mind, a particular object of the invention has been to avoid liability of either tube being distended and enlarged at the swivel joint and of the vacuum being broken at such joint.

The particular embodiment of the invention here illustrated has been designed with reference to such a valve, and it comprises matter originally disclosed and claimed in my application for patent filed January 24, 1922, Serial No. 531,425, entitled "Relief valve," on which Patent No. 1,548,318 was granted August 4, 1925. This application is, therefore, a division of the one above specified. However, it is to be understood that I claim the present invention and divisional subject matter, not merely as a part of such a relief valve, but for any combination and use for which it is adapted.

In the drawing forming a part of this application the single figure represents a relief valve for radiators shown in section and having a siphon tube connected thereto according to the principles of the present invention.

Since the valve itself does not form any part of the invention herein claimed, it is sufficient to say in respect thereto that the numeral 5 designates the casing and 19 a nipple which is threaded into a radiator and has a passage to receive air, steam, and water; that 20 represents a tube contained in the nipple 19, and smaller than its bore, for returning to the radiator water entrapped in the valve; and that 21 represents a curved siphon tube which is adapted to hang down within the radiator and is swiveled to the tube 20. The combination of the tubes 20 and 21 and the joint or coupling between them constitutes the invention for which I claim protection herein, and will now describe.

The tubes 20 and 21 overlap at their adjacent ends in the manner of the sections of a telescope. Considered in respect to their overlapping relationship, the tube 20 is the inner member of the coupling or tube connection and the siphon tube 21 is the outer member or tube. The inner tube is provided with two shoulders or collars or ribs 30 and 31 surrounding the tube and having a space 32 between them. Said shoulders are located at a certain distance from the extremity of the tube 20, for a purpose which will presently appear, said extremity being designated 33 and forming what may be called a trunnion end. If desired, there may be more than two such shoulders, to secure in greater degree the effect due to them.

The outer tube 21 surrounds the ribs 30 and 31 and has a free bearing thereon. It is also formed with an indented zone 34 which forms an internal shoulder surrounding and bearing on the trunnion end 33. The extremity or rim 35 of the outer tube 21 is spun or drawn down, and thus turned or set inward toward and substantially into contact with the surface of the tube 20 beside the shoulder 30. Thus there are four or more zones of bearing between the inner and outer tubes. Such bearings fit closely enough to render the spaces between the shoulders 30 and 31, and also that between the shoulder 30 and the spun-down lip 35, capable of receiving and retaining water enough to act as a seal, effective to prevent the entrance of air into the siphon tube at its upper end and so breaking the siphonic action. At the same time the bearing is loose enough to permit the siphon tube to turn freely about the tube 20 and to hang vertically downward while the valve to which it is attached is being screwed into a radiator.

The bearings formed between the two tubes at the zones 30, 31 and 34 make impossible the spreading open of the spun-down lip 35 by rough handling and knocking about. A serious defect in swivel joints as heretofore applied to siphon tubes in radiator valves, has been that, as a result of rough handling, the joint would open or spread so as to loosen the swivel joint so much that the siphonic action was greatly impaired. With my improved joint this effect cannot occur. I have found that when the connected tubes have been subjected to abuse by rough handling, bending, twisting, etc., the tube 20 would be fractured before any sign of strain was apparent in the spun-over lip 35. In other words, there is practically no liability of the siphonic action being impaired by leakage of air at the joint as the result of rough handling and abuse. I attribute this result to the fact that the reactions of all bending stresses which tend to affect the joint or coupling is taken by the bearings at 30 and 34, and possibly at 31 also, and that the spun-down lip 35 is thereby relieved of all stresses tending to distort and open it.

The security against separation of the connected tubes, which follows such protection of the spun-over lip, is of advantage in other circumstances than the particular case in which the connected tubes are parts of a siphon.

What I claim and desire to secure by Letters Patent is:

1. The combination of two tubes, one of which projects at its end within the end of the other, the inner tube having two external encircling collars or ribs spaced apart from each other and from the adjacent end of the tube with an open space between them adapted to admit the liquid passing through the tubes, said end forming a trunnion, and the outer tube having an internal shoulder surrounding and bearing on said trunnion, and being set inward at its extremity toward the inner tube beyond the shoulder most remote from said trunnion, the portion of the outer tube between said internal shoulder and extremity being formed to surround and bear freely on the outer circumferences of said collars.

2. A swivel tube connection comprising two tubes telescopically overlapped at their contiguous ends, the inner tube having a trunnion end and two enlargements spaced from said trunnion end and from one another, and the outer tube having an internal shoulder bearing on said trunnion end, an enlarged bearing portion surrounding and fitting rotatably about the said enlargement with sufficient looseness to admit liquid from the tubes into the open space between said enlargements, and an inwardly offset zone outside of the enlargement more remote from the trunnion end.

3. The combination of a tube having its outer end formed as a trunnion and having an encircling shoulder back from said end, combined with a second tube of which one end has a larger diameter than said shoulder, and is passed over the trunnion end and shoulder of the first named tube and set inwardly to form a lock cooperating with the shoulder in preventing its removal, the second tube having also an indented zone at the outer side of said shoulder which is offset inwardly so as to form a bearing surrounding and engaging the trunnion end of the first named tube.

In testimony whereof I have affixed my signature.

GEORGE D. HOFFMAN.